Nov. 15, 1960  A. I. ROMAN  2,960,301
VIBRATION AND IMPACT ISOLATOR
Filed March 14, 1955
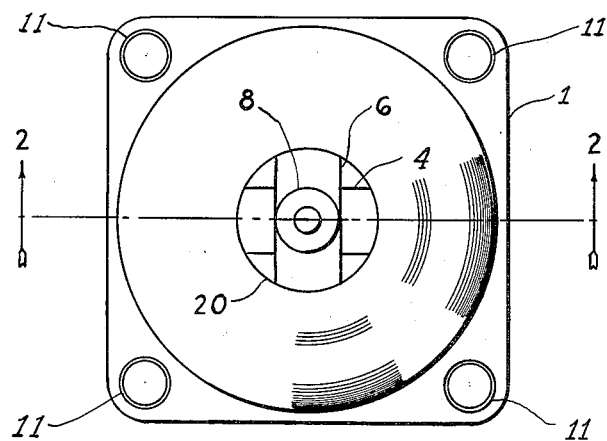
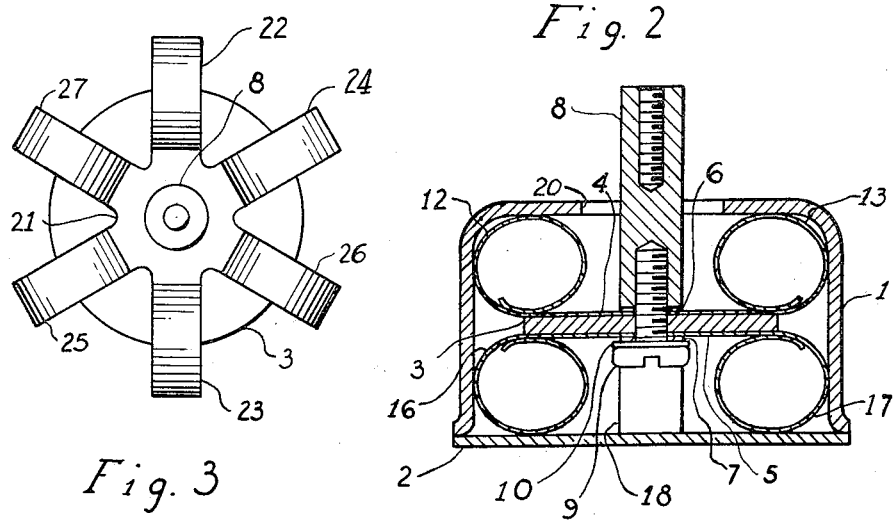
INVENTOR.
BY Alfred I. Roman

2,960,301

VIBRATION AND IMPACT ISOLATOR

Alfred I. Roman, New York, N.Y.
(Box 351, Brigham City, Utah)

Filed Mar. 14, 1955, Ser. No. 493,985

2 Claims. (Cl. 248—358)

This invention relates to new and useful improvements and structural refinements in isolators of mechanical vibration and impact, of the self-contained type which are used as mountings or supports for apparatus or devices that must be protected from harmful vibrations or shock.

One object of the invention is to provide an isolator of large damping capacity to prevent excessive excursion of apparatus when operating at its resonant frequency or any frequency near resonance.

Another object of the invention is to provide a vibration isolator which will operate efficiently at very high and very low temperatures.

Another object of the invention is to provide a vibration isolator that has no permanent set, and so has a longer useful life.

Another object of the invention is to provide a vibration isolator which is capable of operating effectively when underloaded or overloaded, so that small changes of loading will not affect its usefulness.

Another object of the invention is to provide a vibration isolator which may be made adaptable to a very wide range of loads.

Another object of the invention is to provide a vibration isolator which enables the equipment it supports to be installed in any convenient position.

A further object of the invention is to provide a vibration isolator which will remain resilient even when deflected sideways relatively large distances.

A still further object of the invention is to provide a vibration isolator which will not be adversely affected by gasoline, oil, their vapors, or salt spray.

Other objects and advantages of my invention will become apparent from the following detailed description and accompanying drawings in which:

Figure 1 is a plan view of the vibration isolator.

Figure 2 is a vertical section of the isolator on the line 2—2 of Figure 1.

Figure 3 is a plan view of a modified form of resilient member attached to a stud and spacer.

The vibration and impact isolator consists of a cup 1, and a plate or bottom 2, which are held together by the eyelets 11, or by any other convenient means, and together form the container, the resilient members or springs 4, 5, 6 and 7 terminating in loops some of which are identified in Figure 2 by 12, 13, 16, 17 and 18, oppositely disposed at their ends, and may be formed of sheet nickel, stainless steel or any other suitable non-corrosive resilient material, the member 3, which serves as a spacer between the upper and lower springs, the screw 9 and lock washer 10, which serve to hold parts 3, 4, 5, 6 and 7 in place and to fasten them to the stud 8, which extends through opening 20 in the cup and is internally threaded at both ends, the upper threading serving for attachment to the load it supports, and the lower threading for accommodating the screw 9. Any other convenient means may be used for attaching the springs and spacer to the stud without departing from the scope of the invention. The before mentioned loops of springs 4, 5, 6 and 7 are formed so as to be nearly circular, but will assume an approximately elliptical shape when the bottom plate 2 is attached to the cup 1, thereby compressing the springs and effecting a preloaded condition.

When the vibration isolator is mounted in a position corresponding to that of Figure 2, any vertical vibration that is transmitted to it will cause parts 1 and 2 to move up and down relative to the spacer 3, and in so doing, to alternately compress said lower and upper loops respectively. When said loops are compressed, their free ends will slide on the inner faces of the outside portions of said loops, thus effecting a damping action. In a similar manner, when sideways vibrations are transmitted to the vibration isolator mounted in a position corresponding to that of Figure 2, parts 1 and 2 will move left and right relative to spacer 3, alternately compressing both upper and lower loops on the right and left sides respectively, thus causing a damping action effected by the sliding action of the free ends of said loops.

When sudden shock is applied to the isolator, the sliding action of the free ends of the loops reduces the diameter of said loops that are under compression, thus increasing their stiffness and building up a very great resistance to further compression, so obviating the need for any snubbing devices.

My vibration isolator may be adapted to supporting a very great range of loads by varying the thickness and/or the width of the material of the springs, by varying the number of loops per isolator, by varying the size of the loops and by using materials of different temper or stiffness.

When more than four springs or eight loops per isolator, as illustrated in Figure 2 are desired, springs like part 23 shown in Figure 3 may be fabricated. This part may be die-cut or a stamping with loops 22, 23, 24, 25, 26 and 27 formed at opposite ends of the radial arms. Two parts 21 would be used per isolator, one being attached to each face of the spacer 3, being held by the screw 9 engaging in the lower thread of stud 8, and the lock washer 10, or by any other convenient means of attachment. By reducing the number of separate pieces comprising the resilient member to two, assembly of the parts of the isolator is greatly facilitated.

The scope of my invention is not restricted, however, to vibration isolators, but the same principle of compressible loops with sliding free ends may be applied to bumpers of motor vehicles, for absorbing the energy of impact of crashes, and also may be applied to aircraft struts as a substitute for landing gear, to absorb the impact of hard landings.

The accompanying drawings illustrate the preferred form of the invention, although it is to be understood that the invention is not limited to the exact details of construction shown and described, but is susceptible to various modifications and adaptations as will be apparent to those skilled in the art without departing from the scope of the invention as stated in the following claims.

I claim:

1. In a vibration and impact isolator, the combination of a load carrying stud, a washer or spacer, load carrying resilient elements arranged radially on opposite faces of said spacer, each end of said elements terminating in a loop which has a free end, the planes of the radii of said loops being perpendicular to the face of the spacer, and portions of the outer faces of said free ends of the loops slidably bearing against the adjacent inner faces of said loops, as said loops are compressed or expanded, means for fastening together said resilient elements, said spacer and said stud, a cup provided with an opening through which said stud extends, and a plate or bottom which is fastened to said cup, the cup and bottom forming a housing for the isolator, said loops being slightly compressed in said housing to effect a pre-loaded condition.

2. In a vibration and impact isolator, the combination of a load carrying stud, a washer or spacer, a load carrying resilient element mounted on each face of said spacer, each element consisting of a metal disc with radially extending arms which terminate in loops at their ends, each loop having a free end, the planes of the radii of said loops being perpendicular to the face of the spacer, and portions of the outer faces of said free ends of the loops slidably bearing against the adjacent inner faces of said loops, as said loops are compressed or expanded, means for fastening together said resilient elements, said spacer and said stud, a cup provided with an opening through which said stud extends and a plate or bottom which is fastened to said cup, the cup and bottom forming a housing for the isolator, said loops being slightly compressed in said housing to effect a pre-loaded condition.

References Cited in the file of this patent
UNITED STATES PATENTS

| | | |
|---|---|---|
| 2,064,751 | Hussman | Dec. 15, 1936 |
| 2,437,717 | Werner | Mar. 16, 1948 |
| 2,688,479 | Barberra | Sept. 7, 1954 |
| 2,705,606 | Triplett | Apr. 5, 1955 |